(12) United States Patent
Donges

(10) Patent No.: US 6,719,563 B2
(45) Date of Patent: Apr. 13, 2004

(54) DRIVING SIMULATOR

(75) Inventor: Edmund Donges, Fuerstenfeldbruck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 76 days.

(21) Appl. No.: 10/067,939

(22) Filed: Feb. 8, 2002

(65) Prior Publication Data

US 2003/0027104 A1 Feb. 6, 2003

(30) Foreign Application Priority Data

Feb. 10, 2001 (DE) .......................................... 101 06 150

(51) Int. Cl.$^7$ .............................. G09B 19/16; G09B 9/02
(52) U.S. Cl. ................................. 434/29; 434/62; 472/3; 472/27; 472/91; 472/130; 472/136; 472/89
(58) Field of Search ............................... 434/62, 55–59, 434/29; 463/46, 1, 6, 49; 473/3, 27–29, 89–91, 130, 136

(56) References Cited

U.S. PATENT DOCUMENTS

| | | | | |
|---|---|---|---|---|
| 2,142,169 A | * | 1/1939 | Bisch | 472/33 |
| 2,344,454 A | * | 3/1944 | Plotner | 434/55 |
| 3,196,557 A | * | 7/1965 | Davidsen | 434/55 |
| 5,489,212 A | * | 2/1996 | Yoshimoto et al. | 434/55 |
| 5,499,920 A | * | 3/1996 | Trumbull | 434/69 |
| 6,017,276 A | * | 1/2000 | Elson et al. | 472/60 |
| 6,042,382 A | * | 3/2000 | Halfhill | 434/59 |
| 6,155,928 A | * | 12/2000 | Burdick | 463/46 |
| 6,210,164 B1 | * | 4/2001 | Otto | 434/55 |
| 6,354,044 B1 | * | 3/2002 | Lagace, Jr. | 52/79.5 |
| 6,354,838 B1 | * | 3/2002 | Tagge et al. | 434/62 |
| 6,431,872 B1 | * | 8/2002 | Shiraishi | 415/173.3 |
| 6,435,875 B1 | * | 8/2002 | Karussi | 434/29 |

FOREIGN PATENT DOCUMENTS

| | | |
|---|---|---|
| DE | 25 42 409 | 4/1980 |
| DE | 34 17 058 | 1/1985 |
| DE | 31 00 584 | 2/1986 |
| DE | 35 00 904 | 6/1989 |
| DE | 297 16 148 | 12/1997 |
| DE | 198 46 337 | 3/2000 |
| FR | 2 729 241 | 7/1996 |
| GB | 2 316 045 | 2/1998 |

* cited by examiner

*Primary Examiner*—S. Thomas Hughes
*Assistant Examiner*—John L. Sotomayor
(74) *Attorney, Agent, or Firm*—Crowell & Moring LLP

(57) ABSTRACT

The invention relates to a driving simulator, particularly for simulating the movements of earthbound vehicles. To take into account the special features of the movements of earthbound vehicles, the proposed driving simulator has a carrier unit that has a rigid floor platform, on which a test vehicle can be mounted. The carrier unit also includes at least one projection surface and at least one projector, and at least three movement modules, each of which has a wheel that rolls on a floor surface. The wheel can be steered, relative to the axis extending perpendicular to the floor, via a first drive, and can be driven by a respectively associated second drive.

29 Claims, 3 Drawing Sheets

DRIVING SIMULATOR

BACKGROUND AND SUMMARY OF THE INVENTION

This application claims the priority of German Application No. 101 06 150.1, filed Feb. 10, 2001, the disclosure of which is expressly incorporated by reference herein.

The invention relates to a driving simulator, particularly for simulating the movements of earthbound vehicles. Earthbound vehicles include surface vehicles, such as road and rail vehicles, ships or aircraft on an airfield. Special embodiments of the driving simulator may also be used for simulating the movements of aircraft and spacecraft.

Driving simulators have been known for some time. In particular, a "six-legged movement system" meets the requirements of the field of flight simulation. For fully dynamic simulations, this six-legged movement system is expanded with a carriage that moves in the x and y directions. It has been seen, however, that these movement systems are very complex, heavy and cost-intensive when employed in simulating the movements of earthbound vehicles. Moreover, this simulation method can only generate the forces and moments that occur in earthbound vehicles with an enormous power requirement.

The representation of accelerations by a movement system of a driving simulator is of fundamental significance for creating the experience of dynamic fringe maneuvers. In earthbound vehicles, the imaging of translatory accelerations in the simulation region requires a change from the real-life situation, because translatory movements from the comparatively "infinite dimension of the real roadway network" must be projected onto a finite dimension of a movement surface. The rotational degrees of freedom of movement, unlike the translatory degrees of freedom, can be imaged in their entirety and to a realistic extent in a more or less limited movement space, depending on the selected concept of the movement system.

It is the object of the present invention to provide a driving simulator that takes into account the special qualities of the movements of earthbound vehicles, and assures a particularly realistic simulation.

The inventive step essentially lies in moving an object (self-propelled carrier unit), which can receive a vehicle or a dummy vehicle, over an essentially horizontal floor surface in the required manner. An advantageous embodiment of the movement surface in a driving simulator of the invention is as a level surface, particularly a circular or oval-shaped surface, because in automobiles the tire-road adhesion permits accelerations of approximately equal magnitude in the longitudinal and transverse vehicle directions ([comb-type] frictional circle). The invention is also clearly distinguished from the six-legged system with the x and y carriage in that additional centrifugal forces due to circular driving patterns can be employed considerably more easily.

A notable feature of the driving-simulator concept in accordance with the invention is that the centrifugal accelerations occurring when the carrier unit (carrier platform) moves in circular patterns can also be used in principle to represent sustained longitudinal accelerations. Here, the longitudinal axis of the respective test vehicle (or dummy vehicle) supported on the carrier unit is oriented relative to the center point of the circle through a corresponding rotation of the carrier unit.

In accordance with the invention, the object is accomplished by providing a driving simulator, particularly for simulating the movements of earthbound vehicles and watercraft, having a carrier unit. The carrier unit includes a rigid floor platform, on which a test vehicle or a test dummy can be mounted. At least one projection surface (A) and at least one projector are provided. At least three movement modules are provided, each of which has a wheel that rolls on a floor surface and can be steered, relative to the axis extending perpendicular to the floor surface, by a first drive, and can be driven by a respectively associated second drive. In contrast to the aforementioned "six-legged movement system," the concept of the present invention—as indicated above—is based on the movement system of a self-moving object, which takes into account the fact that the core movements of an earthbound vehicle are executed in the horizontal plane, while the vertical dimension only plays a secondary role.

The present driving simulator includes a carrier unit having a rigid floor in the form of a platform (floor platform), on which a test vehicle is mounted—for example, in the center of the platform—on its own wheels, or on which the dummy vehicle is mounted. The dummy vehicle can be embodied as a so-called "mock-up," that is, a mechanical vehicle simulation or decoy, or as a mock seat, or a so-called "cave," a virtual, three-dimensional representation of the vehicle. The carrier unit also has at least one projection surface, onto which at least one projector can project an image for a driving simulation.

The primary components of the carrier unit are movement modules, which permit a movement of the carrier unit, at least in the horizontal plane. Each movement module, which is preferably disposed at the periphery of the carrier unit or the floor platform, possesses a wheel or a twin wheel that rolls on a floor surface and can be steered by a first drive relative to the axis extending perpendicular to the floor platform. A second drive is provided for driving the wheel in the two directions of rotation.

The self-moving carrier unit requires at least three movement modules. To assure stability, it can be advantageous to use four or five preferably equidistantly-spaced movement modules. The independent guidance of the wheels in terms of their steering axle and the wheel drive itself allows for pure forward and backward movements, pure transverse movements, pure rotational movements, and combinations of these movements. The drives for the respective wheels are preferably disposed in the wheel hubs. This allows the drive to have an especially compact design. Each wheel can be used to generate a driving and a braking moment. The required braking moment may require the provision of an additional wheel-brake arrangement.

The notably circular carrier unit simultaneously constitutes an ideal base for a projection mounting or dome. In accordance with one embodiment, the projection dome is spherical or spherical-segment-shaped, and has at least one projection surface on its inside. The projection surface can also be designed for a 360° simulation. For this purpose, appropriate projectors must be provided. In closed test vehicles, the projection can be limited to a horizontal ring of the semi-spherical surface, which is preferably to be dimensioned such that the driver's eye position affords him a view of all of the viewing fields. For open vehicles, the projection could be effected in the manner of an "Optimax" film. The projectors can preferably be disposed in the projection dome, particularly in the region of the zenith of the dome. Another option is rear projection, in which the projectors are disposed outside of the semi-spherical projection surface and project from the outside onto a semi-transparent projection screen. The number and arrangements of the projectors vary according to the type of projection.

A noise simulation can be effected, for example, with an audio system of a vehicle. In addition, the carrier unit, test vehicle or dummy vehicle can be equipped with further audio systems for locally simulating engine, rolling and wind noises.

Physical variables that are not actually present can therefore be simulated through visual impressions (projection surface), tactile impressions (vibrations) and acoustic impressions (noise simulation).

As mentioned above, the primary action in earthbound vehicles plays out in the horizontal region. When a vehicle moves on a road, however, vertical movements also occur due to uneven spots in the road surface or changes in the driving dynamics. If, in a first completed stage of the driving simulator, there is no display of a lifting degree of freedom, a lifting movement can be implemented in a further embodiment. It is thus possible to provide further drives in the individual movement modules for permitting a vertical movement of the floor platform of the carrier unit with respect to the floor surface. These drives can be conceptualized as hydraulic linear cylinders or hydraulic or electrical lifting-spindle drives.

As an alternative, or in addition, a corresponding lifting or lowering device can be provided in the floor platform of the carrier unit at, for example, the locations where the tires of the test vehicle are mounted on the carrier plates of the floor platform. In the structural embodiment of the respective lifting arrangement, it can be ensured that the lifting amplitude does not exceed an order of magnitude of 1 m in a use as a driving simulator. In a use as an air or space flight simulator, the lifting amplitude can be selected to be correspondingly larger. If the rolling and pitch degree of freedom of the vehicle movements is only passively realized in the first alternative because the vehicle mounted on the floor platform also produces lifting, rolling and pitch movements with its own chassis due to the acting acceleration forces, it is possible to initiate active lifting, rolling and pitching through the additional implementation of lifting devices in the second alternative. In this connection, it is important to note that the rolling and pitch axes are disposed at the height of the driver's inner ear, so no misdirected acceleration information is supplied to the inner ear during unsteady lifting, rolling and pitch movements.

In both embodiments, it is necessary to tether the test vehicle to avoid an undesired displacement of the vehicle relative to the floor platform when acceleration forces are exerted. This tethering can be effected, for example, with restraining shackles or straps that connect the four wheel rims to four mounting plates of the floor platform.

These wheel-mounting plates, in turn, must permit a longitudinal and transverse displacement of the wheel-mounting surfaces in an order of magnitude of +/−20 mm so that the resilient movements of the vehicle chassis can be initiated extensively without causing a secondary bending movement of the wheel suspension. The mounting plates for the four wheels are therefore to be embodied, for example, in the form of sliding plates or pendulum-supported plates whose nonlinear elasticity always returns the wheel-mounting surfaces to the initial position in the event of a force-free movement state or an inoperative state of the driving simulator.

In accordance with a special embodiment, the carrier unit drives on a level floor surface of a simulation structure, which is preferably covered by a ceiling, dome or air-inflated structure. The level floor surface can be circular or oval-shaped, and, at least with respect to a navigable expansion, significantly larger than the dimensions of the carrier unit (e.g., about 8 m). The edges of the level surface can additionally be provided with safety devices, such as safety fences or safety cushions that prevent the carrier unit from moving beyond the floor surface.

A problem facing the structural design of the driving simulator according to the invention is how the carrier unit is to be supplied with power and information for the various drives, projectors, etc. In one version, this can be effected by embodying the carrier unit to be self-sufficient, in which case a power generator (e.g., an internal-combustion engine/generator unit) and calculation units that permit a corresponding movement with the associated simulation effects are installed in the carrier unit. Alternatively, it is possible to provide the carrier units with information externally. This can be effected, for example, by way of a radio connection. The power supply would have to be assumed by the carrier unit itself in this case. A different embodiment of the supply lies in running a connecting cable between the carrier unit and an element of an external environment, such as the simulation structure; here, both power and information can be supplied via the connecting cable.

The carrier unit can, however, also be supplied with power through pantographs (similarly to electric locomotives or city buses) that tap the electrical power, using sliding contacts, from a power system that spans the movement surface, and conduct the power back via the floor surface, which may be embodied as a ground pole.

Other objects, advantages and novel features of the present invention will become apparent from the following detailed description of the invention when considered in conjunction with the accompanying drawings.

DETAILED DESCRIPTION OF THE DRAWINGS

Figure 1:
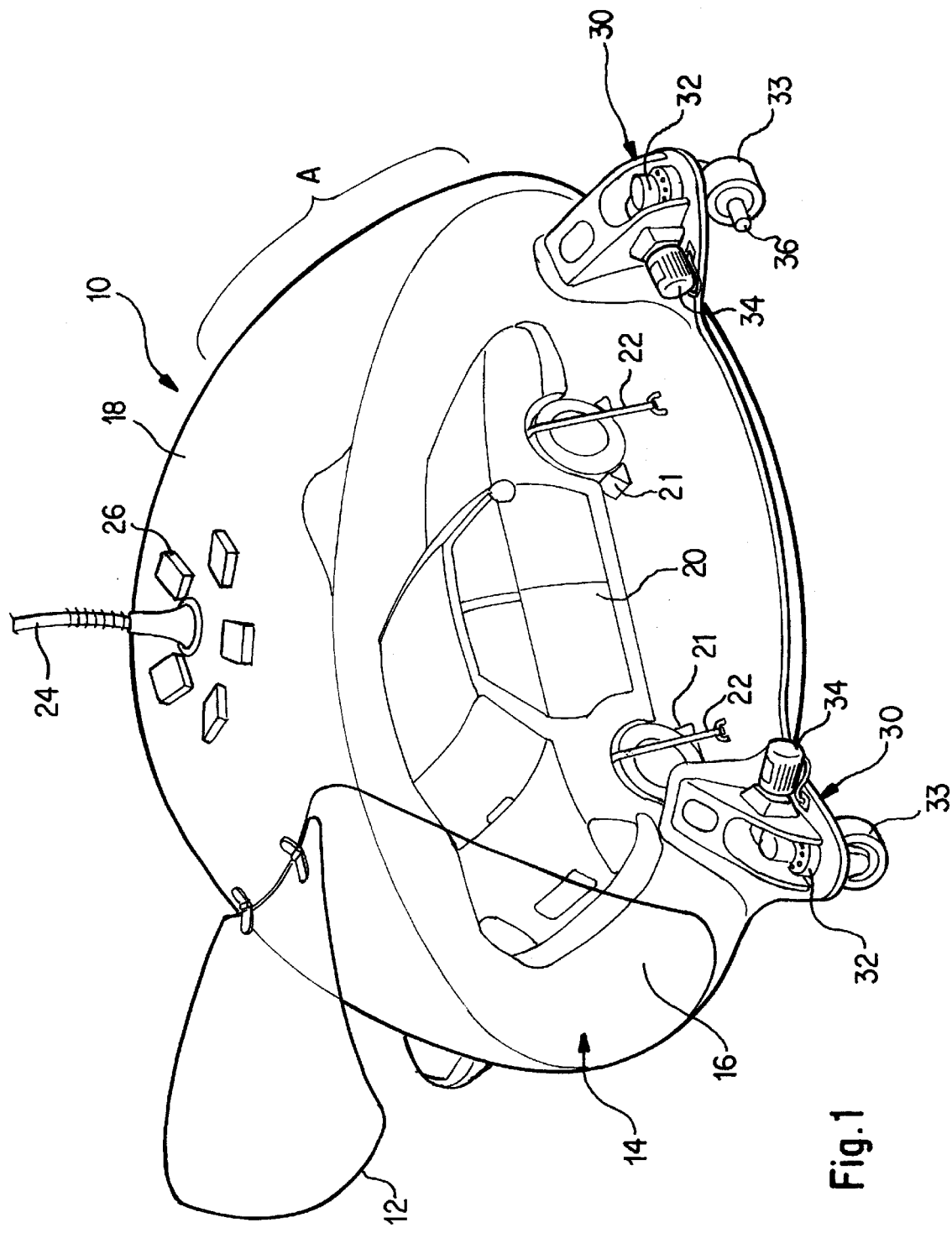
FIG. 1 is a schematic, perspective view of an embodiment of a carrier unit in accordance with the invention.

FIG. 1 illustrates a carrier unit 10 of a driving simulator, which has a floor platform 16 that is spanned by an approximately semi-spherical projection surface 18. On one side, the projection surface 18 has an opening 14, which can be closed with a flap 12, and through which a vehicle 20 can enter the carrier unit 10. In accordance with FIG. 1, the vehicle 20 is positioned centrally on the floor surface 16 of the carrier unit 10, and secured as described above. Only restraining straps 22 for securing the vehicle can be inferred from FIG. 1. The wheel-mounting plates are not shown in detail.

Four movement modules 30 are disposed, with equal angular spacing from one another, at the periphery of the carrier unit 10. Each movement module 30 encompasses a wheel 33, which rolls on a floor surface 62 (FIG. 2) and can be steered relative to an axis extending perpendicular to the floor surface. In this instance, a respective first drive 32 can rotate the wheels 33 in a range of +/−90° about the given perpendicular axis.

A second electromotoric drive 36 and a wheel brake (not shown in detail) are disposed in the region of the hub of each wheel 33; the drive 36 serves to act on each wheel 33 with respect to its rolling movement, namely to accelerate, brake or hold the movement constant. In the present embodiment, further drives 34 are additionally provided for each movement module 30; these drives extend or retract the wheels in the perpendicular direction, so the floor platform 16 of the carrier unit 10 can be raised or lowered in the region of the respective movement module 30. The actuation of the various drives of the movement modules allows the carrier unit 10 to move straight forward or backward, move to the left or right, rotate (yaw angle right/left) or execute any combination of these movements. Of course, a calculation and steering unit is required for coordination; this unit initiates the appropriate actuator for a desired simulation, and correspondingly actuates the aforementioned drives.

A connecting cable 24 leading from the zenith of the projection dome 18 spanning the floor 16 to an external unit (not shown) enables the communication between the carrier unit 10 and a simulation computer. This connecting cable 24 also effects the power supply for the individual drives.

As indicated in FIG. 1, five projectors 26 are disposed inside the projection dome 18 so as to permit an essentially 360° all-round view. This all-round view appears on an approximately horizontal ring of the semi-spherical surface of the projection dome 18, in the region A. The relevant techniques are known, and need not be discussed in detail here.

Not shown here is an audio system of the carrier unit 10, with which different noises, such as engine, rolling and wind noises, can be played in the interior of the carrier unit 10. Also not shown are vibration exciters, which can be disposed at the engine gear unit, the exhaust-gas train and the chassis, so the vibration of the engine/gear unit, the exhaust-gas system and the chassis can be simulated, for example.

Figure 2:
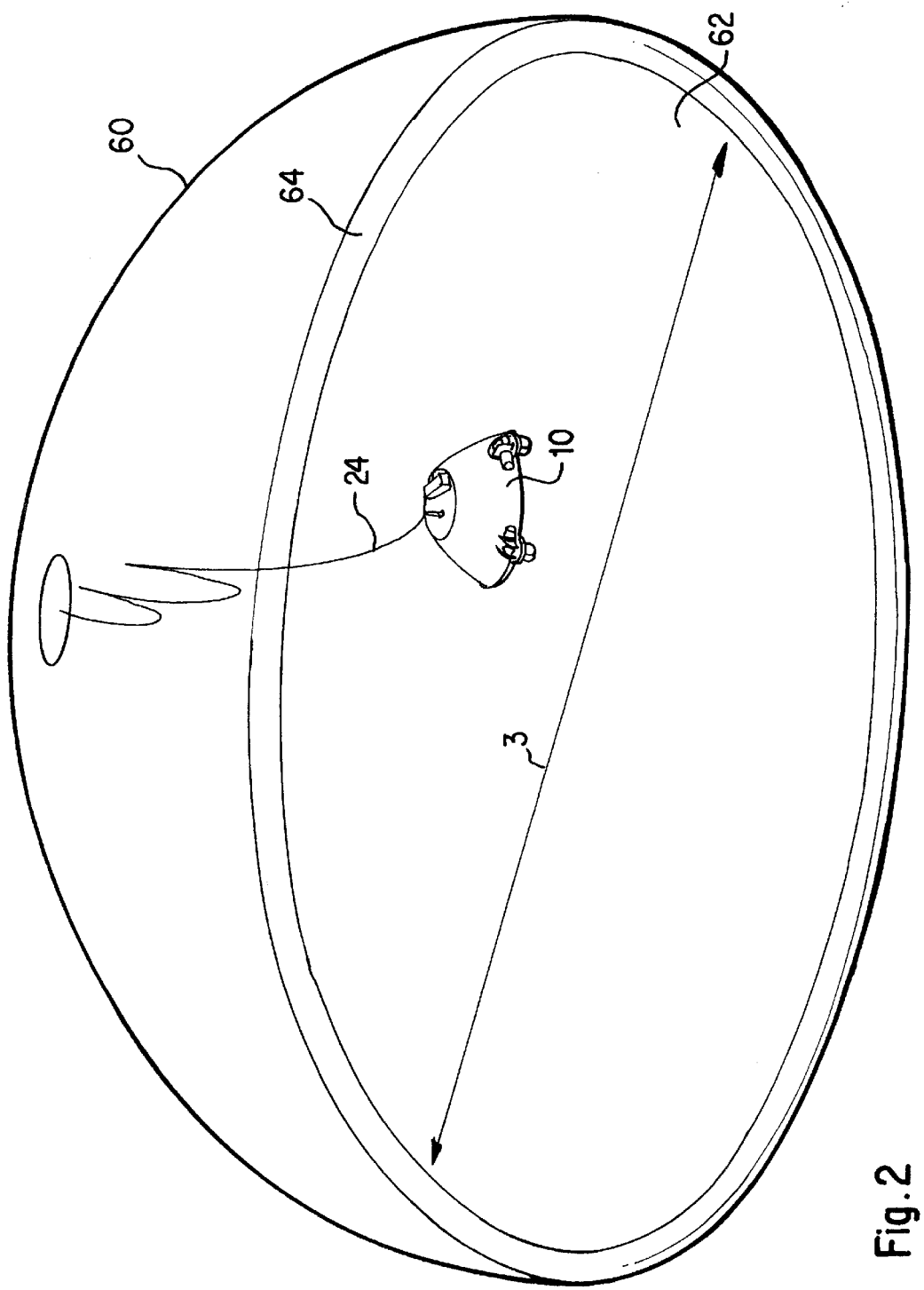
FIG. 2 is a schematic, perspective view of a carrier unit accommodated in a simulation structure according to FIG. 1.

The concept of the self-moving vehicle ensues from FIG. 2. The carrier unit 10 can move on a level floor surface 62 of a simulation structure. The level floor surface 62 is spanned by a dome 60, from whose zenith a connecting cable 24 is guided to the carrier unit 10. In the present case, the level floor surface 62 is essentially round with a diameter of about 40 m. The level floor surface is bordered radially by a safety cushion 64, which prevents the carrier unit 10 from leaving the floor surface 62.

Figure 3:
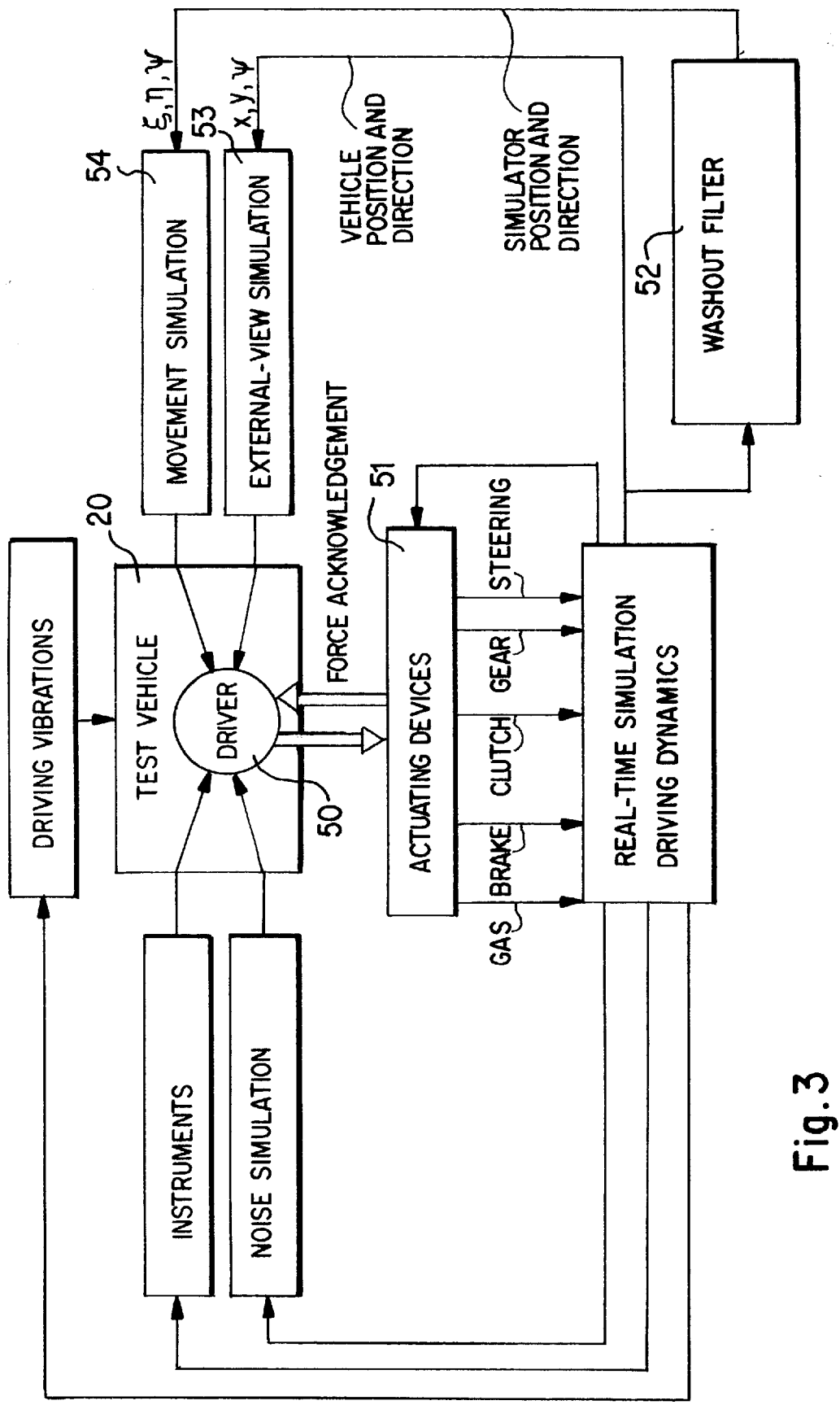
FIG. 3 is a block diagram that explains the simulation process in detail.

To enable the interaction between the driver and the driving simulator, the vehicle must also be coupled to the carrier unit for exchanging information. FIG. 3 illustrates the simulation procedure. A driver 50 in the test vehicle 20 operates various actuating devices 51, such as the driving pedal (gas), the brake, the clutch, the gear shift (gear) and the steering wheel (steering). This information is conveyed via a vehicle/carrier unit connection and the connecting cable 24 to a computer, not shown. This computer uses the driver's reactions to create commands for the driving, acoustical and optical units. The signals for the projectors are calculated in a graphics region, and conducted to the projectors via the connecting cable 24, which assures a matched [external-view] simulation 53. With a so-called "washout filter," 52 the real movements of an actual vehicle are scaled onto the limited movement surface of the simulator, and variables for the drives that were calculated in the computer are transmitted to the carrier unit. This permits a simulation of the movements 54 of the carrier unit, and thus of the vehicle it contains. Furthermore, the computer operates the aforementioned audio system, so associated noise simulations (such as acceleration, braking, wind noises), etc., can be effected.

To simulate an actual drive for the operator, the instruments in the vehicle must be synchronized with the driving sensations the driver feels in the vehicle. To this end, the vehicle instruments are acted upon appropriately by way of the different connections. Finally, the preferred arrangement of vibration devices on vehicle parts is actuated, as described above, so the corresponding, natural vibration effects can also be created. This arrangement can create all impressions that are crucial for a driver when operating a vehicle, so the driver is provided with various feedback. A more or less realistic driving simulation is assured, depending on the quality of the match. The crux, however, is the carrier unit, whose special embodiment permits a near-real-time acknowledgement of acceleration.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driving simulator for simulating movements of vehicles, comprising:
    a self-propelled carrier unit including:
        a floor platform upon which one of a test vehicle and test vehicle dummy is mountable;
        at least one projection surface;
        at least one projector arranged to project on the projection surface; and
        at least three movement modules, each of said movement modules having a wheel and first and second drives, said wheel being capable of rolling on a floor surface and being steerable, relative to an axis extending through the wheel perpendicular to the floor surface, via the first drive, and being driven via the second drive, wherein the carrier unit is freely moveable over the floor surface.

2. The driving simulator according to claim 1, wherein the floor platform of the carrier unit is a rigid floor platform.

3. The driving simulator according to claim 1, further comprising at least one additional movement module on the carrier unit.

4. The driving simulator according to claim 1, further comprising a wheel brake provided for at least one of said wheels of the at least three movement modules.

5. The driving simulator according to claim 1, wherein said at least three movement modules are disposed about a periphery of one of the carrier unit and the floor platform.

6. The driving simulator according to claim 1, wherein a steering angle range of the wheel about the axis extending perpendicular to the floor surface lies in a range of +/−180°.

7. The driving simulator according to claim 1, wherein a steering angle range of the wheel about the axis extending perpendicular to the floor surface lies in a range of +/−90°.

8. The driving simulator according to claim 1, wherein the second drive is operable to accelerate and brake a respective wheel in both wheel rotation directions.

9. The driving simulator according to claim 1, wherein the second drive for each wheel is provided in a wheel hub.

10. The driving simulator according to claim 1, wherein the floor platform is substantially circular.

11. The driving simulator according to claim 1, further comprising a projection dome, said projection dome spanning the floor platform of the carrier unit.

12. The driving simulator according to claim 11, wherein said projection dome is substantially semi-spherical.

13. The driving simulator according to claim 11, wherein a plurality of projectors are provided in the projection dome.

14. The driving simulator according to claim 12, wherein a plurality of projectors are provided in the projection dome.

15. The driving simulator according to claim 11, wherein said at least one projector is disposed exteriorly to one of the projection surface and the projection dome, said projector projecting an image via rear projection.

16. The driving simulator according to claim 11, wherein a plurality of projectors are provided, said projectors being essentially disposed in a zenith of the projection dome.

17. The driving simulator according to claim 1, wherein a plurality of projectors are provided, a number and arrangement of said plurality of projectors being selected to permit substantially 360° projection.

18. The driving simulator according to claim 1, further comprising an acoustical system for the driving simulator.

19. The driving simulator according to claim 1, wherein the floor platform includes movable mounting plates, and further comprising securing elements for fixing the test vehicle or test dummy to the movable mounting plates.

20. The driving simulator according to claim 1, wherein said movement modules each further comprise a third drive with which a respective wheel is extendable or retractable in the perpendicular direction relative to the floor platform.

21. The driving simulator according to claim 1, further comprising additional devices with which the test vehicle or test dummy is raisable or lowerable relative to the floor platform.

22. A driving simulator for simulating movements of vehicles, comprising:
   a carrier unit including:
      a floor platform upon which one of a test vehicle and test dummy is mountable;
      at least one projection surface;
      at least one projector arranged to project on the projection surface; and
      at least three movement modules, each of said movement modules having a wheel and first and second drives, said wheel being capable of rolling on a floor surface and being steerable, relative to an axis extending perpendicular to the floor surface, via the first drive, and being driven via the second drive, and
   further comprising a simulator structure in which the carrier unit is accommodated, said sumulator structure including the floor surface upon which the carrier unit is movable.

23. The driving simulator according to claim 22, wherein the floor surface is substantially level and bordered by a safety device that prevents the carrier unit from moving beyond the floor surface.

24. The driving simulator according to claim 22, wherein the floor surface has one of a circular and oval shape.

25. The driving simulator according to claim 23, wherein the floor surface has one of a circular and oval shape.

26. The driving simulator according to claim 22, wherein the simulator structure is substantially larger in at least one travelable direction than the carrier unit.

27. The driving simulator according to claim 22, further comprising a communication device provided between the simulator structure and the carrier unit.

28. The driving simulator according to claim 22, wherein the simulator structure includes a ceiling, and further comprising a connecting cable extending from the ceiling to the carrier unit for enabling communications and/or power to be supplied to the carrier unit.

29. The driving simulator according to claim 1, wherein said vehicles are one of earthbound and water craft vehicles.

* * * * *